United States Patent [19]
Alcock et al.

[11] 3,791,148
[45] Feb. 12, 1974

[54] MOTOR-DRIVEN HYDROSTATIC TRANSMISSION

[75] Inventors: Richard A. Alcock, Rockford; Wayne A. Shosie, Loves Park, both of Ill.

[73] Assignee: Fastener Engineers, Inc., Rockford, Ill.

[22] Filed: Dec. 13, 1972

[21] Appl. No.: 314,757

[52] U.S. Cl............... 60/456, 60/488, 60/DIG. 5, 60/DIG. 10
[51] Int. Cl...................... F16h 39/46, F16h 41/30
[58] Field of Search 60/329, 456, 458, 488, DIG. 5, 60/DIG. 10

[56] References Cited
UNITED STATES PATENTS
2,560,749  7/1951  Stacy ................................. 60/329
2,938,347  5/1960  Sturgis ................................ 60/456
2,961,829  11/1960  Weisenbach ..................... 60/456 X
3,411,296  11/1968  Peterson ............................ 60/488
3,486,335  12/1969  Kern et al. ........................ 60/488

Primary Examiner—Edgar W. Geoghegan
Attorney, Agent, or Firm—Morsbach, Pillote & Muir

[57] ABSTRACT

A motor-driven hydrostatic transmission of the type having an electric drive motor for driving an hydraulic pump that supplies fluid to an hydraulic motor. The electric drive motor and hydraulic pump are face mounted on opposite sides of a centrifugal blower housing with their shafts in alignment and drivingly interconnected by a shaft coupling, and a centrifugal blower is mounted on the shaft coupling for blowing air over a heat exchanger connected in the hydraulic circuit of the hydraulic transmission.

8 Claims, 5 Drawing Figures

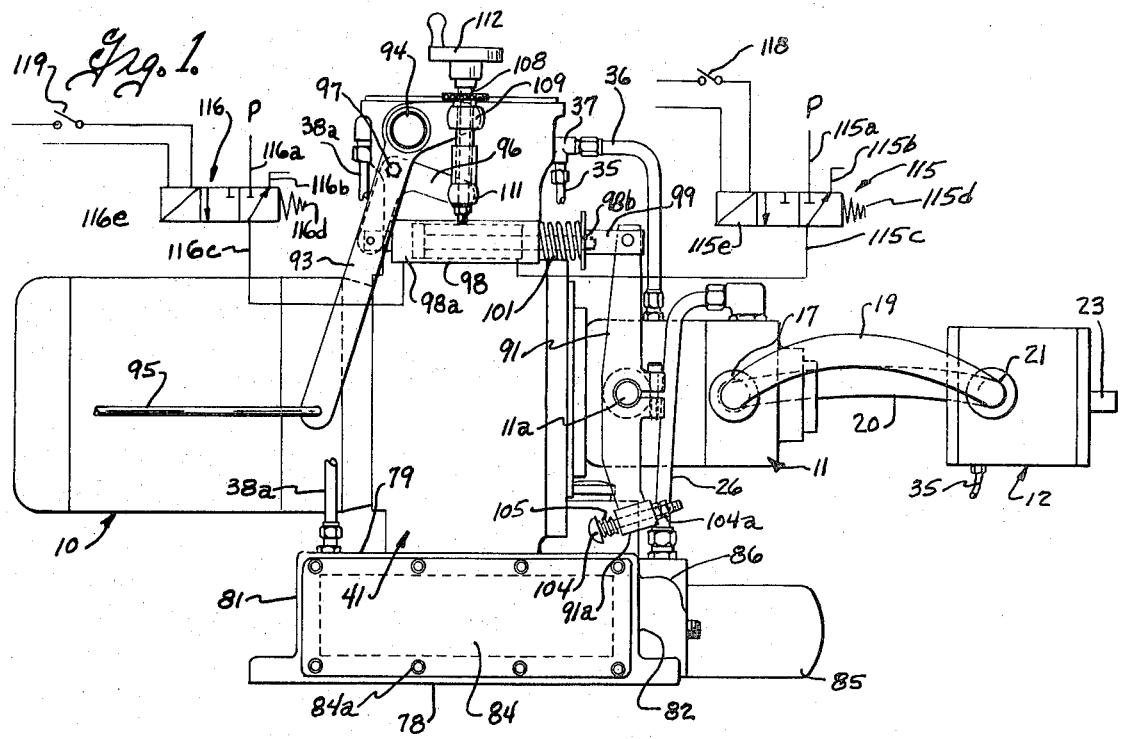
Fig. 1.
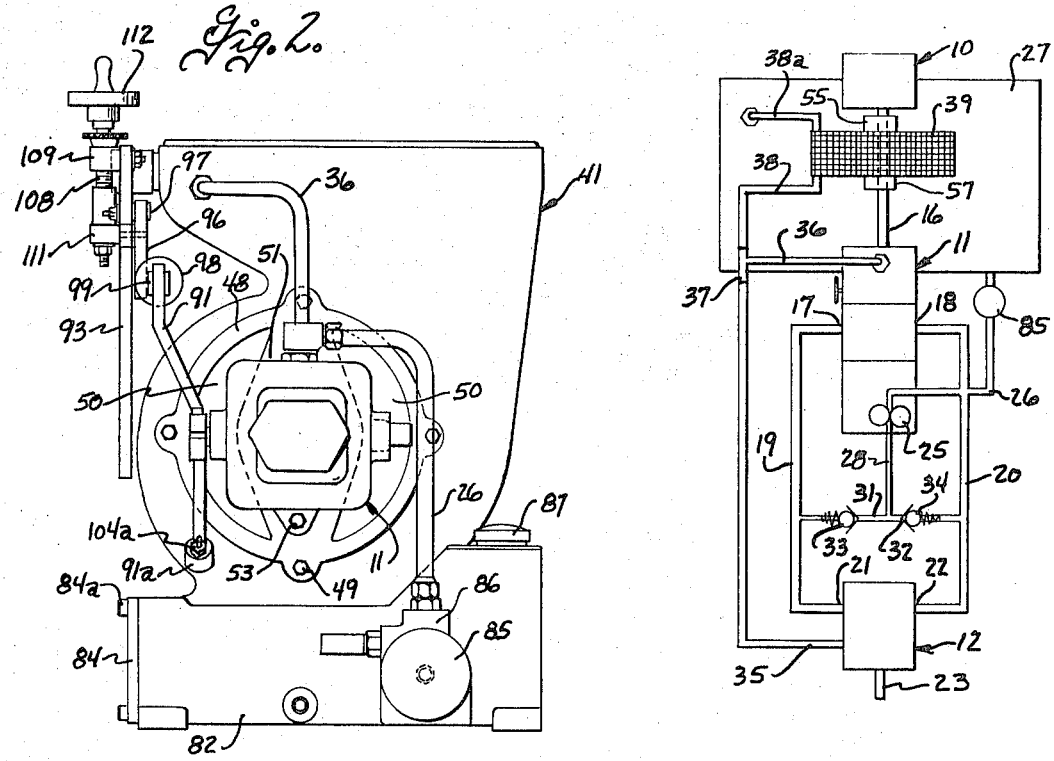
Fig. 2.
Fig. 5.

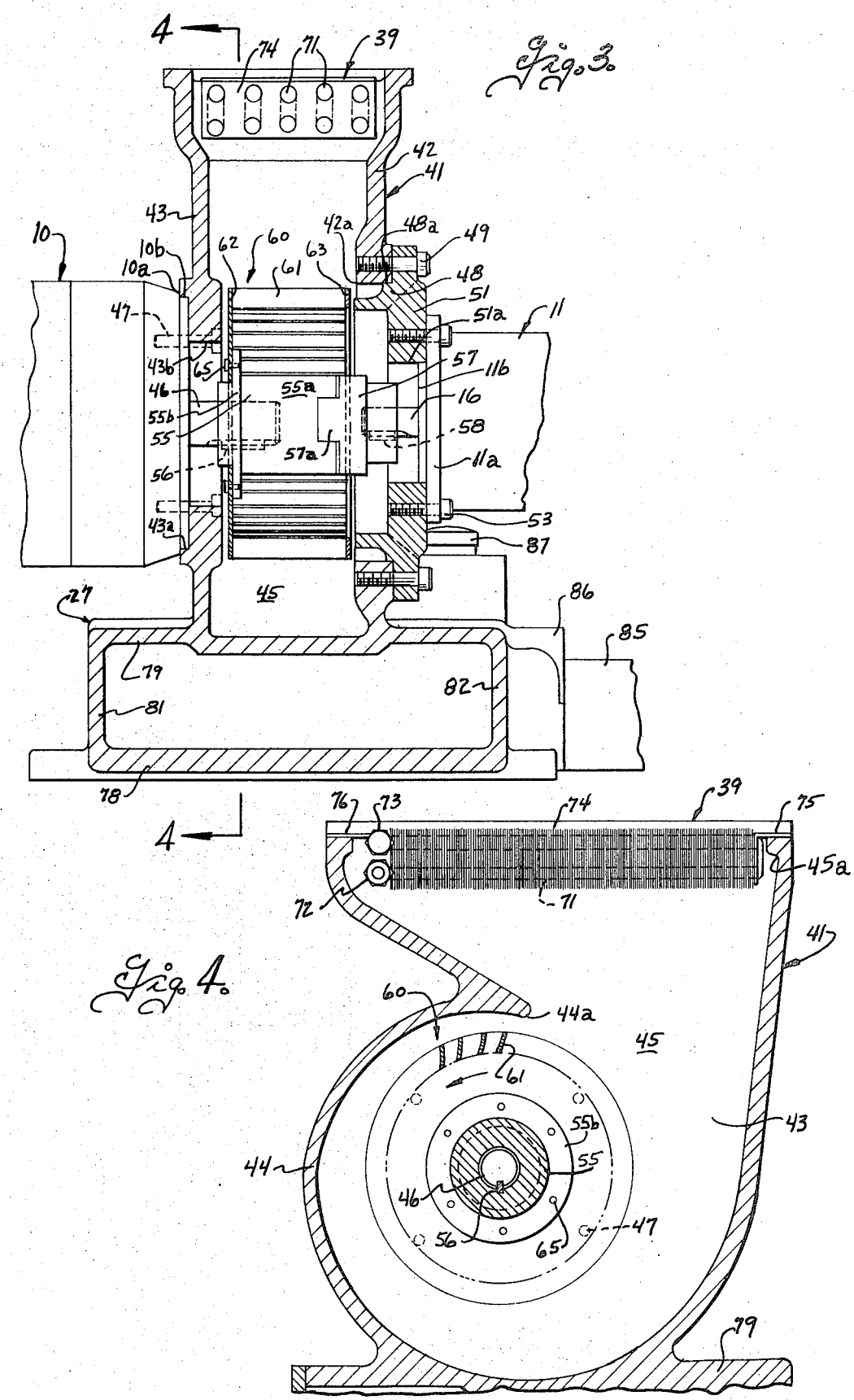

MOTOR-DRIVEN HYDROSTATIC TRANSMISSION

BACKGROUND OF THE INVENTION

Temperature control in hydraulic systems frequently requires the use of a heat exchanger for cooling the hydraulic fluid. While heat exchangers with separate fan motors are commonly used, some motor-driven hydrostatic transmission systems have heretofore been made in which the electric drive motor is coupled at one end to the hydraulic pump to drive the same, and with a heat exchanger cooling fan mounted on the other end of the motor, to avoid the necessity of a separate fan motor for the heat exchanger. Mounting of the heat exchanger fan on the end of the electric drive motor remote from the pump necessitates a special motor construction having a double-ended shaft. Moreover, this arrangement substantially increases the overall length of the electric motor-driven pump apparatus and locates the heat exchanger and fan at the outer end of the unit where it is exposed to damage.

It has also been proposed to mount an annular heat exchange coil around the shaft coupling between an electric drive motor and an hydraulic pump with a centrifugal fan rotor mounted on the motor shaft for centrifugally forcing air out through the annular coil to cool the same. The annular heat exchange coil in such apparatus was open around its outer periphery to allow the air to pass outwardly through the coil and not only had relatively low cooling efficiency but also required foot mounting of the electric drive motor pump and coil as separate units on the base with consequent problems in achieving proper alignment of the several units.

SUMMARY OF THE INVENTION

The present invention relates to a motor-driven hydrostatic transmission system in which the electric drive motor and the hydraulic pump are face mounted on opposite sides of a centrifugal blower housing to support the motor and pump with their shafts in alignment and drivingly interconnected by a shaft coupling. The housing defines a volute chamber for a centrifugal fan rotor mounted on the shaft coupling in the blower housing for forcing air over a heat exchanger located at the outlet of the blower housing and laterally offset from the volute chamber. The reservoir for hydraulic fluid is advantageously formed at the lower end of the blower housing to provide a substantially self-contained hydrostatic transmission unit.

The face mounting of the electric drive motor and hydraulic pump on opposite side walls of the centrifugal blower housing facilitates alignment of the motor and pump shafts and further assures that the centrifugal fan rotor on the motor shaft is in proper relation with the volute chamber. In addition, the arrangement of the centrifugal blower between the motor and pump minimizes the overall length of the motor-driven transmission unit and the length of the hydraulic lines required to connect the heat exchanger in the hydraulic circuit of the hydrostatic transmission.

These, together with other features and advantages of this invention will be more readily understood by reference to the following detailed description when taken in connection with the accompanying drawings wherein:

FIG. 1 is a side elevational view of the motor-driven hydrostatic transmission apparatus, with portions of the controls shown diagrammatically;

FIG. 2 is an elevational view of the motor-driven hydrostatic transmission apparatus from the pump end of the unit;

FIG. 3 is a fragmentary longitudinal sectional view through the hydrostatic transmission apparatus;

FIG. 4 is a transverse sectional view taken on the plane 4—4 of FIG. 3; and

FIG. 5 is a schematic diagram of the hydraulic circuit of the hydrostatic transmission system.

The present invention relates to a motor-driven hydrostatic transmission system including an electric drive motor 10, an hydraulic pump 11 adapted to be driven by the motor 10, and an hydraulic motor 12 connected in an hydraulic circuit with the pump 11 to be driven thereby. The pump 11 is of the reversible, variable displacement type having a drive shaft 16 at one end and a pair of pump ports 17, 18. The hydraulic motor 12 has an output shaft 23 adapted for connection to a load (not shown) and a pair of pump ports 21 and 22, and the hydraulic pump and motor are connected in a closed transmission circuit by main conduits 19 and 20. The hydraulic circuit for the hydrostatic transmission also includes a charge pump 25 which is driven from the main pump shaft 16 and which has its inlet connected through a supply line 26 to a reservoir 27, and its outlet connected through conduit 28 and branch conduits 31 and 32 to the main conduits 19 and 20 respectively. The branch conduits contain check valves 33 and 34 arranged as shown so that the charge pump delivers fluid to whichever of the main conduits is the low pressure conduit, and is isolated from the main conduit which is the high pressure conduit. The hydraulic circuit for the hydrostatic transmission also includes a motor case drain line 35 and a pump case drain line 36 which are conveniently interconnected as by a T fitting 37 to a common return line 38 leading directly or indirectly back to the reservoir 27.

In hydraulic transmission systems it is common practice to provide a heat exchanger in the low pressure or return lines for cooling the hydraulic fluid. In hydrostatic type transmissions, the heat exchanger can be located in the motor case return line 35, the pump case return line 36 or in the combined return line 38 from the pump and motor cases. Alternatively, some hydrostatic transmissions provide a relief circuit of the type disclosed in the U. S. Pat. No. 2,961,829, issued Nov. 29, 1960 and which includes low and high pressure relief valves which are connected through a shuttle valve to the main transmission conduits such as 19 and 20, and which shuttle valve responds to the pressure differential between the main conduits and serves to connect the low pressure conduit with the low pressure relief valve and to connect the high pressure conduit with the high pressure relief valve. In such hydrostatic transmissions, the low pressure relief valve discharges to a reservoir either directly or through the case return lines and, in such hydrostatic transmissions, the heat exchanger can be located in the return line from the low pressure relief valve.

In accordance with the present invention, a centrifugal blower housing 41 is constructed to provide a rigid support for mounting the electric drive motor 10 and hydraulic pump 11 in axial alignment, with the blower housing located between the drive motor and pump. The blower housing includes laterally spaced upwardly extending side walls 42 and 43 which are interconnected by a casing wall 44 of spiral form to form a centrifugal blower volute chamber 45. The motor 10 has a drive shaft 46 extending from one end 10a thereof and the motor 10 is face mounted on one of the side walls 43 of the blower housing with the motor drive shaft 46 extending into the blower chamber. In the embodiment illustrated, the motor 10 has a NEMA type C end face which has an annular locating boss or rim 10b concentric with the shaft 46 and extending into a peripheral recess 43a in the side wall 43 of the blower housing to radially locate the motor on the blower housing, and the motor is secured to the side wall as by cap screws 47 that extend through circumferentially spaced openings in the side wall into the end of the motor 10. The motor drive shaft 46 extends through an opening 43b in the side wall 43, which opening is preferably somewhat larger than the shaft to accommodate a shaft coupling to be described hereinafter.

The hydraulic pump 11 is mounted on the other side wall 42 of the blower housing. In order to facilitate assembly of the apparatus, side wall 42 is formed with an opening 42a concentric with opening 43a in the side wall 43 and dimensioned slightly larger than the outer diameter of the centrifugal fan rotor, to allow axial insertion and removal of the fan rotor therethrough. An annular rim 48 is mounted on the side wall as by fasteners 49 to provide an annular shroud having an inner diameter corresponding generally to the inlet of the centrifugal fan rotor and the rim 48 has an annular locating boss 48a that extends into the side wall opening 42a to radially locate the rim on the side wall 42. A pump mounting bracket 51 is conveniently formed integrally with the rim member 48 and extends crosswise of the rim member as best shown in FIGS. 2 and 3 to provide a pump mounting pad, the bracket being spaced from the rim member adjacent opposite sides as shown in FIG. 2 to provide air intake openings 50. The bracket has a pump receiving opening 51a concentric with the boss 48a on the rim. The pump 11 is face mounted on the bracket 51 and has mounting lugs 11a that are secured as by fasteners 53 to the pump mounting bracket 51 and a locating boss 11b that extends into the opening 51a in the pump mounting bracket to radially locate the pump on the mounting bracket and thereby radially locate the pump relative to the blower housing with the pump shaft 16 in approximate alignment with the motor drive shaft 46.

The motor shaft 46 and pump shaft 16 are drivingly interconnected by a shaft coupling having limited lateral or parallel flexibility so as to be capable of accommodating slight misalignment of the shafts. Various different types of shaft couplings can be utilized and the coupling may, for example, be a jaw coupling or a disk-type coupling including an input coupling member 55 which is non-rotatably connected as by a key 56 to the motor shaft, and an output coupling member 57 which is nonrotatably connected, as by a key 58 to the pump shaft 16, the input and output coupling members having interengaging means such as teeth 55a and 57a which engage, either directly or indirectly through a composition disk, to drivingly interconnect the members.

A centrifugal fan rotor 60 is provided in the blower housing and drivingly connected to the shaft and, preferably, the centrifugal fan rotor is of the cage type having a plurality of vanes 61 arranged in an annular bank and attached at one end to a drive disk 62, and interconnected at their other ends by a ring 63 that defines the air intake opening of the centrifugal fan rotor. The centrifugal fan rotor is drivingly connected to the shafts by attachment to the coupling and, as best shown in FIG. 3, the input coupling member 55 has a flange 55b which is drivingly connected to the drive disk 62 as by fasteners 65. As will be seen from FIG. 3, the rim member 48 defines a shroud that extends to a point closely adjacent the ring 63 adjacent its inner periphery.

As best shown in FIG. 4, the casing wall 44 defines a scroll-type housing in which the flow passage between the centrifugal fan rotor 60 and the casing wall progressively expands in the direction of rotation of the rotor from the inlet end 44a of the casing wall 44 to an outlet horn having an outlet opening 45a laterally offset from the volute chamber. The outlet opening 45a is preferably directed upwardly as shown in FIG. 4, it being understood that the outlet could be arranged to direct the air to one side or at intermediate angles, if desired. The heat exchanger 39 is mounted to extend across the outlet opening 45a in the blower housing and, in the embodiment shown, the heat exchanger comprises a plurality of laterally spaced U-shaped tubes 71 which are connected to fluid intake and fluid outlet manifolds 72 and 73 respectively, and which are preferably finned as indicated at 74 to enhance the cooling capacity. The heat exchanger is supported as by brackets 75 and 76 on the blower housing and the inlet manifold 72 is connected to the return line 38 and the outlet manifold 73 is connected to the return line section 38a leading back to the reservoir 27.

The reservoir 27 is advantageously formed integrally with the blower housing and shaped to provide a horizontally enlarged support base for the blower housing. As shown, the reservoir includes a generally horizontal bottom wall 78, top wall 79, end walls 81 and 82 and side walls 83 and 84. The lower portion of the blower housing is supported on the top wall and preferably formed integrally therewith. In the form shown, one of the reservoir side walls 84 is in the form of a cover plate removably attached to the reservoir walls by fasteners 84a. As will be seen from FIG. 1, this arrangement of the blower and heat exchanger intermediate the drive motor and pump enables use of relatively short intake lines 26, pump case return lines 36 and heat exchanger return line 38a. A filter 85 is advantageously provided in the end of the line 26 and, as shown, the filter 85 is mounted on a filter mounting pad 86 on the end wall 82 of the reservoir housing, which pad is ported to communicate the filter 85 with the reservoir and to communicate the intake line 26 with the filter, in a manner well understood in the art. A reservoir filler opening closed by a cap 87 is provided in the top wall 79 of the reservoir.

As previously described, the pump 11 is preferably of the variable displacement type such as the rotary cylinder barrel, longitudinally reciprocating piston type having an actuating shaft 11a which is operated as by a lever 91 to move the cam plate from the neutral or zero displacement position selectively in either direction to vary the rate and direction of displacement of the pump and hence the rate of speed and direction of rotation of the hydraulic motor 12. Lever 91 can be operated manually or by various different controls depending upon the application of the hydraulic transmission unit. In the embodiment illustrated, a linkage arrangement is provided to normally position the pump cam plate at a preselected angle to normally drive the motor in one direction and at a preselected speed, with an override to vary the speed under the control of an external signal, and with selectively operable controls to move the actuating lever 91 to its neutral position or to its reverse position, as desired. In the embodiment illustrated, this linkage arrangement includes a bell crank lever 93 pivotally mounted intermediate its ends at 94 on the blower housing and adapted for connection at one end through a link 95 to an external speed control mechanism (not shown). A second bell crank lever 96 is pivotally mounted intermediate its ends at 97 on the bell crank 93 for movement therewith and one end of the bell crank 96 is connected to the cylinder end 98a of a linear actuator 98. The piston end 98b of the actuator 98 is connected as through a clevis 99 to one end of the pump actuating lever 91. A spring 101 is interposed between the cylinder and the clevis bracket 99 to normally urge the actuator to an extended position and a yieldable stop 104 is provided on the other end of the lever 91 to limit movement of the pump cam actuating lever 91 under the action of the spring 101, when the lever reaches its neutral or zero displacement position. As shown, the yieldable stop 104 is slidable in a boss 91a on the lever 91 and is yieldably urged to an extended position by a spring 105. Adjustable stop nuts 104a are provided on the stop 104 to adjust its extended position and the stop is arranged to engage an abutment on the housing when the lever 91 reaches its neutral or zero displacement position. Spring 105 is selected so as to be relatively stronger than spring 101 so as to stop movement of the lever 91 under the bias of spring 101 when the pump reaches its neutral position.

The other end of the bell crank 96 is adjustable relative to the bell crank 93 by a screw 108 which is threadedly mounted in a swivel nut 109 on the bell crank 93 and which is rotatably and non-slidably mounted in a swivel bracket 111 on the bell crank 96. The screw 108 can be adjusted as by a wheel 112 to vary the position of the bell crank 96 relative to bell crank lever 93, to thereby vary the position of pump cam operating lever 91, when the linear actuator 98 is retracted. Fluid such as air is selectively applied to the linear actuator 98 under the control of a pair of three-way valves 115 and 116. Three-way valve 115 has a pressure inlet 115a, an exhaust outlet 115b and a controlled outlet 115c connected to the rod end of the actuator cylinder 98. The valve is normally positioned as by a spring 115d to exhaust fluid from the rod end of the cylinder and it is operated, when the actuator 115e is energized, to a position applying fluid pressure to the rod end of the cylinder. As diagrammatically illustrated, actuator 115e is controlled by a switch 118. Valve 116 has a pressure inlet 116a, an exhaust outlet 116b and a controlled outlet 116c which is connected to the blind end of the cylinder 98 and valve 116 is normally positioned by a spring 116d in a position exhausting fluid from the blind end of the cylinder. The valve is operated, when the actuator 116e is energized, to a position supplying fluid pressure to the blind end of the cylinder. As shown, valve actuator 116e is controlled by a switch 119.

When both valves 115 and 116 are in their normal positions shown, both the rod end and blind end of the cylinder actuator 98 are exhausted so that the piston in the linear actuator 98 is positioned under the control of the spring 101 to thereby normally position the pump actuating lever 91 in its neutral or zero displacement position with the stop 104 engaging an abutment on the housing. When valve actuator 115e is energized, it applies fluid pressure to the rod end of the cylinder to retract the rod and move the pump cam actuating lever 91 to a position which is adjustable under the control of the screw 108 and the operating lever 93 so that the displacement of the pump is controlled by the actuating rod 95. Conversely, when valve actuator 115e is deenergized and valve actuator 116e is energized, valve 116 applies fluid pressure to the blind end of the cylinder to extend the rod. The force exerted by the linear actuator is made sufficient to overcome the spring 105 in the yieldable stop 104 so as to effect movement of the control lever 91 to a reverse position. The control linkage is thus arranged to normally position the lever 91 in its neutral position and the fluid actuator can be selectively operated to either effect variable control of the lever 91 under the control of actuating lever 93 or, alternatively, to effect movement of the pump actuating lever 91 to its reverse position.

From the foregoing it is thought that the construction and operation of the motor-driven hydrostatic transmission will be readily understood. The centrifugal blower housing is constructed to provide a rigid support for face mounting the electric drive motor and the hydraulic pump with their shafts in axial alignment with each other and in a position to support the centrifugal fan rotor in proper relation to the spiral wall of the volute chamber to define a progressively expanding passage around the centrifugal fan rotor which progressively reduces the velocity energy of the air from the centrifugal fan rotor and increases the static pressure of the air as it is passed over the heat exchanger. This arrangement enables use of a drive motor with a single-ended shaft to also operate the heat exchange blower, and the location of the heat exchanger between the drive motor and pump reduces the overall size while also reducing the length of the hydraulic lines necessary to interconnect the pump, heat exchanger and reservoir.

The embodiments of the invention in which an exclusive property or privilege is claimed are defined as follows:

1. A motor-driven hydrostatic transmission system including an electric drive motor having a drive shaft at one end, hydraulic pump means having an input shaft at one end, a reservoir for hydraulic fluid, an hydraulic motor having an output shaft, hydraulic circuit means connected to said hydraulic motor means and said reservoir and said hydraulic motor to drive the hydraulic motor from said pump means, and a heat exchanger connected in said hydraulic circuit means for cooling the hydraulic fluid, the improvement comprising a centrifugal blower housing constructed to provide a support for the electric drive motor and hydraulic pump, the blower housing having a mounting base at its lower end and laterally spaced side walls extending upwardly from the base and a spiral casing wall extending between the side walls and defining a volute chamber having an air outlet opening between said side walls laterally offset from the volute chamber, means face mounting said one end of the electric drive motor on one of said side walls for support thereon with the drive shaft extending into the volute chamber eccentric to said spiral side wall, said other side wall having an opening therein and bracket means extending across said opening and face mounting said one end of the pump means on said other side wall for support thereon with the input shaft extending into said volute chamber in approximate alignment with said drive shaft, a shaft coupling in said chamber drivingly interconnecting said motor drive shaft and said input shaft of the pump means, a centrifugal fan rotor in said volute chamber around said shaft coupling and drivingly connected to one of the shafts in the chamber for rotation therewith, said heat exchanger being mounted on said housing to extend across said air outlet opening for cooling by the air discharged from said centrifugal fan rotor.

2. A motor-driven hydrostatic transmission system according to claim 1 wherein said mounting base defines a reservoir chamber at the lower end of the blower housing separate from the volute chamber providing said reservoir for hydraulic fluid.

3. A motor-driven hydrostatic transmission system according to claim 1 wherein said centrifugal fan rotor is of the squirrel cage type having a drive disk at the end adjacent said one side wall of the housing and circumferentially spaced impeller vanes on the drive disk defining an air intake opening at its other end adjacent said opening in said other side wall of the housing.

4. A motor-driven hydrostatic transmission system according to claim 3 wherein said opening in said other side wall is dimensioned larger than the outer diameter of said fan rotor to allow axial insertion and removal therethrough and said bracket for mounting the pump on said other side wall includes an annular rim attached to said other side wall and defining a shroud extending to the air intake opening in the fan rotor, said bracket having air inlet openings inwardly of said shroud.

5. A motor-driven hydrostatic transmission system according to claim 1 wherein said shaft coupling includes a drive member on said electric motor drive shaft and a drive member on the pump input shaft, and means mounting said centrifugal fan rotor on said drive member of the shaft coupling.

6. A motor-driven hydrostatic transmission system according to claim 1 wherein said outlet opening of said volute chamber is located adjacent the top of said blower housing.

7. A motor-driven hydrostatic transmission system according to claim 1 wherein said one end of the motor has an annular locating boss concentric with said motor drive shaft and said one end wall of the blower housing has an annular recess receiving said locating boss on the motor to radially locate the motor on the blower housing, said opening in said other side wall being concentric with said locating recess in said one side wall, said bracket means including an annular rim member having an annular boss extending into said opening in said other side wall to radially locate the bracket means on said other side wall, said pump means having an annular locating boss on said one end thereof concentric with said input shaft and said bracket means including a pump mounting portion extending across said rim member and having an annular inwardly facing shoulder concentric with said annular boss on the rim member and engaging said boss on the pump to thereby radially locate the pump relative to the blower housing.

8. A motor-driven hydrostatic transmission system according to claim 7 wherein said centrifugal fan rotor is of the squirrel cage type having an air intake opening at the end adjacent said other side wall, said rim member of said bracket means defining an annular shroud extending to the air intake opening in the fan rotor, said bracket means having air inlet openings between said pump mounting portion and said rim member.

* * * * *